United States Patent
Rong (10) Patent No.: US 11,894,719 B2
(45) Date of Patent: Feb. 6, 2024

(54) PERMANENT MAGNET OF MULTIPLE PIECES HAVING DIFFERENT EASY AXES

(71) Applicant: FORD GLOBAL TECHNOLOGIES, LLC, Dearborn, MI (US)

(72) Inventor: Chuanbing Rong, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 647 days.

(21) Appl. No.: 17/016,863

(22) Filed: Sep. 10, 2020

(65) Prior Publication Data
US 2022/0077725 A1 Mar. 10, 2022

(51) Int. Cl.
| | |
|---|---|
| H02K 1/02 | (2006.01) |
| H01F 1/053 | (2006.01) |
| H01F 1/14 | (2006.01) |
| H02K 1/27 | (2022.01) |
| H02K 21/14 | (2006.01) |
| H02K 1/276 | (2022.01) |

(52) U.S. Cl.
CPC ............ H02K 1/02 (2013.01); H01F 1/053 (2013.01); H01F 1/14 (2013.01); H02K 1/276 (2013.01); H02K 21/14 (2013.01)

(58) Field of Classification Search
CPC ........ H02K 1/276; H02K 1/2766; H02K 1/02; H02K 21/14; H01F 7/021; H01F 1/053; H01F 1/14
USPC ..................................................... 310/156.56
See application file for complete search history.

(56) References Cited

U.S. PATENT DOCUMENTS

| | | | | |
|---|---|---|---|---|
| 4,417,168 A | * | 11/1983 | Miller | H02K 1/2726 310/156.52 |
| 4,536,230 A | * | 8/1985 | Landa | H01F 7/021 148/303 |
| 5,013,951 A | * | 5/1991 | Stadnik | H02K 1/2773 310/156.41 |
| 5,191,256 A | * | 3/1993 | Reiter, Jr. | H02K 1/2726 310/410 |
| 7,982,350 B2 | * | 7/2011 | Burch | H02K 1/14 310/90 |
| 8,072,106 B2 | * | 12/2011 | Petro | H02K 16/00 310/156.08 |
| 9,130,418 B2 | * | 9/2015 | Metral | H02K 1/17 |
| 9,373,433 B2 | | 6/2016 | Johnson et al. | |
| 9,634,527 B2 | * | 4/2017 | Zhang | H02K 1/17 |
| 9,634,528 B2 | * | 4/2017 | Zhang | H02K 1/2766 |
| 9,831,726 B2 | * | 11/2017 | Zhang | H02K 1/2766 |
| 9,866,093 B2 | * | 1/2018 | Wu | H02K 1/2773 |
| 10,014,737 B2 | * | 7/2018 | Fischer | H02K 1/278 |
| 10,199,889 B2 | * | 2/2019 | Piech | H02K 1/27 |
| 2006/0005898 A1 | * | 1/2006 | Liu | H01F 1/058 148/105 |

(Continued)

Primary Examiner — Alex W Mok
(74) Attorney, Agent, or Firm — David B Kelley; Brooks Kushman P.C.

(57) ABSTRACT

A rotor of an electric machine includes a rotor core defining a magnet channel extending axially between opposing ends of the rotor core. A permanent magnet is disposed in the channel and has opposing ends and opposing major sides. The magnet includes a central piece of anisotropic magnetic material having a first magnetically easy crystallographic axis, and a corner piece of anisotropic magnetic material joined to the central piece and having a second magnetically easy crystallographic axis that is oblique to the first easy axis.

17 Claims, 5 Drawing Sheets

(56) References Cited

U.S. PATENT DOCUMENTS

| | | | |
|---|---|---|---|
| 2010/0127590 A1* | 5/2010 | Metral | H02K 23/04 |
| | | | 310/154.15 |
| 2012/0036696 A1 | 2/2012 | Murakami et al. | |
| 2015/0091407 A1* | 4/2015 | Kayano | H02K 1/2766 |
| | | | 310/156.38 |
| 2015/0229194 A1* | 8/2015 | Sromin | H02K 1/32 |
| | | | 310/156.32 |
| 2016/0065008 A1* | 3/2016 | Metral | H02K 13/10 |
| | | | 310/80 |
| 2016/0329786 A1* | 11/2016 | Wu | H02K 21/14 |
| 2017/0162311 A1* | 6/2017 | Shimbo | H01F 7/021 |
| 2017/0187256 A1* | 6/2017 | Zhang | H02K 21/14 |
| 2017/0187258 A1* | 6/2017 | Fujikawa | H02K 15/03 |
| 2018/0130581 A1* | 5/2018 | Fujikawa | H01F 41/0273 |
| 2018/0183289 A1* | 6/2018 | Horiuchi | H02K 1/24 |
| 2018/0336981 A1* | 11/2018 | Fujihara | H01F 7/02 |

* cited by examiner

PERMANENT MAGNET OF MULTIPLE PIECES HAVING DIFFERENT EASY AXES

TECHNICAL FIELD

This disclosure relates to permanent magnets for electric machines, and more specifically to permanent magnets of multiple pieces having different easy axes.

BACKGROUND

Many automobile manufacturers are producing electric and hybrid-electric vehicles to improve fuel economy and reduce pollution. These vehicles include a traction battery and one or more electric machines powered by the traction battery. Each electric machine includes a stator and a rotor that is supported for rotation within the stator. The rotor is mounted on a shaft that is drivably connected to the driven wheels by one or more powertrain components. One type of rotor has embedded permanent magnets. Torque produced by the electric machine is sent to the driven wheels by the powertrain components to propel the vehicle.

SUMMARY

According to one embodiment, a rotor of an electric machine includes a rotor core defining a magnet channel extending axially between opposing ends of the rotor core. A permanent magnet is disposed in the channel and has opposing ends and opposing major sides. The magnet includes a central piece of anisotropic magnetic material having a first magnetically easy crystallographic axis, and a corner piece of anisotropic magnetic material joined to the central piece and having a second magnetically easy crystallographic axis that is oblique to the first easy axis.

According to another embodiment, a rotor of an electric machine includes a rotor core defining a magnet channel extending axially between opposing ends of the rotor core, a prismatic permanent magnet is disposed in the channel and has opposing first and second ends, opposing front and back faces extending axially between the opposing ends, and opposing first and second sides extending axially between the opposing ends and extending laterally between the opposing faces. The magnet is formed of multiple pieces and includes a central piece of magnetic material having a front surface that forms a portion of the front face, a back surface that forms a portion of the back face, and a side surface extending between the front and back surfaces. The central piece has a first magnetically easy crystallographic axis that is substantially normal to the faces. A front corner piece is joined to the side surface and has a front surface that forms a portion of the front face, a side surface that forms a portion the first side, and an end surface that forms a portion of the first end. The front corner piece has a second magnetically easy crystallographic axis that is oblique to the first easy axis. A back corner piece is joined to the side surface of the central piece and to a back surface of the front corner piece. The back corner piece has a back surface that forms a portion of the back face, a side surface that forms a portion of the first side, and an end surface that forms a portion of the first end. The back corner piece has a third magnetically easy crystallographic axis that is oblique to the first and second easy axes.

According to yet another embodiment, a multiple-piece permanent magnet of an electric machine includes a prismatic body having opposing first and second ends, opposing front and back faces extending axially between the opposing ends, and opposing first and second sides extending axially between the opposing ends and extending laterally between the opposing faces. The body is formed of multiple pieces and includes a central piece of magnetic material having a front surface that forms a portion of the front face, a back surface that forms a portion of the back face, and a side surface extending between the front and back surfaces, wherein the central piece has a first magnetically easy crystallographic axis that is substantially normal to the faces. The body further includes a first corner piece joined to the side surface and having a front surface that forms a portion of the front face, a side surface that forms a portion the first side, and an end surface that forms a portion of the first end, wherein the front corner piece has a second magnetically easy crystallographic axis that is oblique to the first easy axis.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
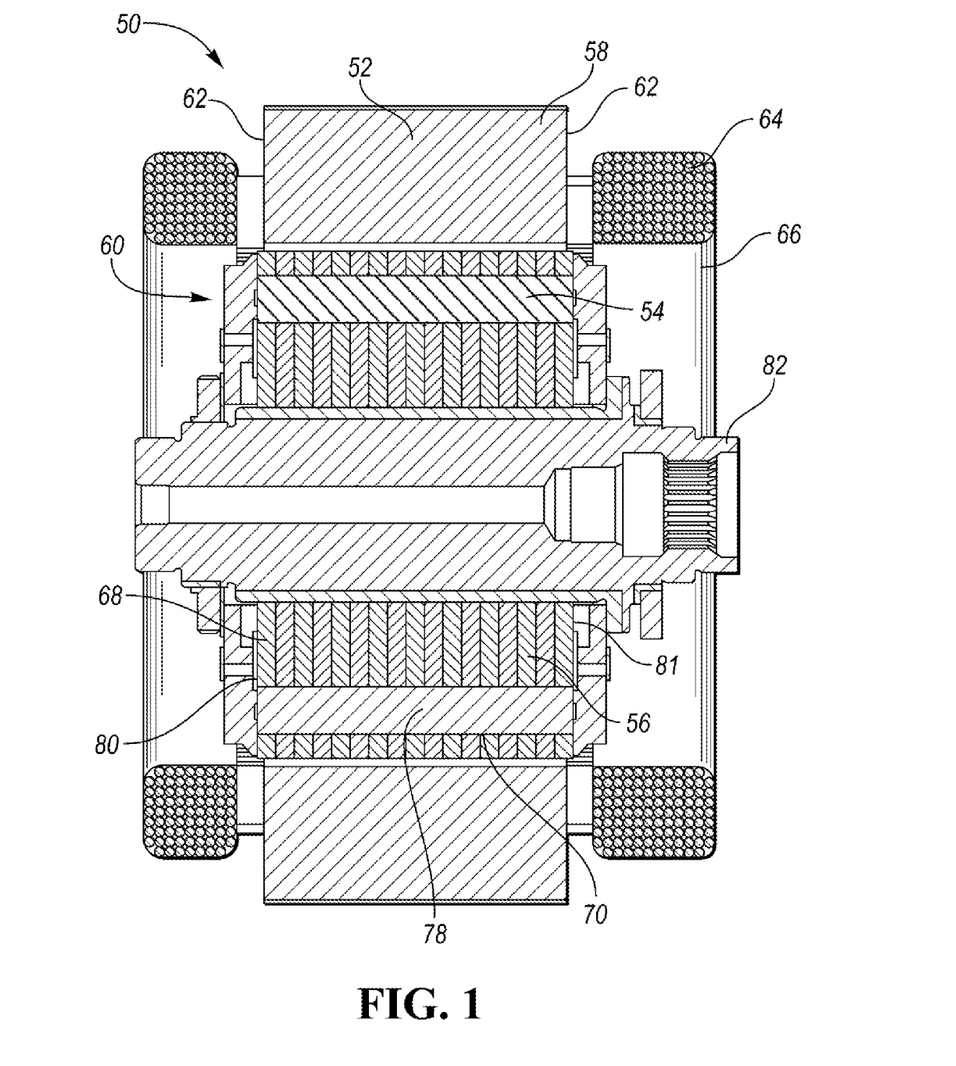
FIG. 1 is a diagrammatical side view, in cross section, of an electric machine.

Referring to FIG. 1, an electric or hybrid electric vehicle may include an electric machine 50 for propelling the vehicle. The electric machine 50 may act as a motor and/or a generator depending upon operating conditions. The electric machine 50 may be a permanent-magnet AC machine. While described as an electric machine for a vehicle, the electric machine 50 may be used in a wide range of applications.

The electric machine 50 may include a stator 52 having a plurality of laminations (not shown). Each of the laminations includes a front side and a back side. When stacked, the front and back sides are disposed against adjacent front and back sides to form a stator core 58. Each of the laminations may be doughnut shaped and define a hollow center. Each lamination also includes an outer diameter (or outer wall) and an inner diameter (or inner wall). The outer diameters cooperate to define an outer surface of the stator core 58, and the inner diameters cooperate to define a cavity 60.

Each lamination may include a plurality of teeth extending radially inward toward the inner diameter. Adjacent teeth cooperate to define slots. The teeth and the slots of the laminations are aligned with each other to define stator slots extending through the stator core 58 between the opposing end faces 62. The end faces 62 define the opposing ends of the core 58 and are formed by the first and last laminations of the stator core 58. A plurality of windings (also known as coils, wires, or conductors) 64 are wrapped around the stator core 58 and are disposed within the stator slots. The windings 64 may be disposed in an insulating material (not shown). Portions of the windings 64 generally extend in an axial direction along the stator slots. At the end faces 62 of the stator core, the windings may bend to extend circumferentially around the end faces 62 of the stator core 58 forming end windings 66. While shown as having distributed windings, the windings could also be of the concentrated or hairpin type.

Figure 2:
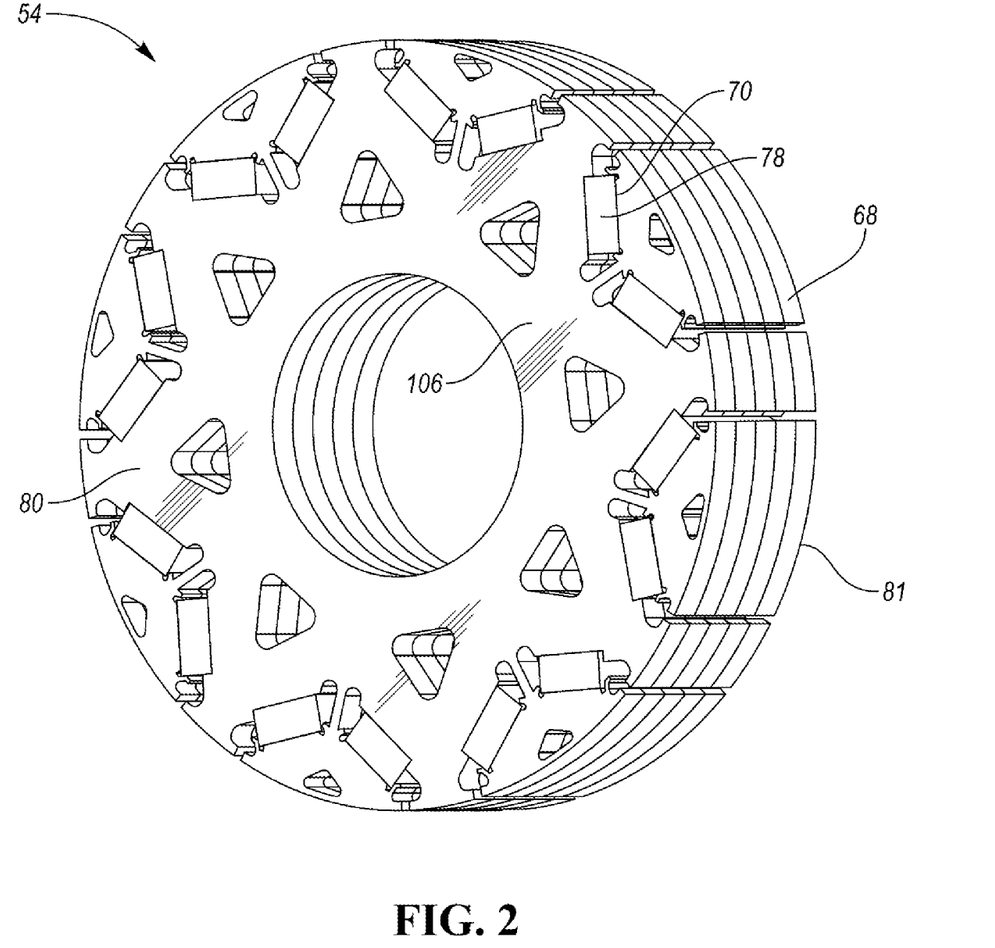
FIG. 2 is a perspective view of a rotor.

Referring to FIGS. 1 and 2, a rotor 54 is disposed within the cavity 60 and supported for rotation relative to the stator 52, which is typically a stationary component. The rotor 54 may be supported on a shaft 82 and positioned inside the stator 52 so that an air gap is formed between the rotor 54 and the stator 52. When current is supplied to the stator 52, a rotating magnetic field is created in the stator 52 causing the rotor 54 to spin generating a torque. The shaft 82 is configured to output the torque to another component such as a gearbox.

The rotor 54 has a rotor core 56 that may be formed of a plurality of stacked laminations 68. The laminations are typically steel plates but may be formed of any material having a high magnetic permeability. The rotor core 56 may define one or more magnet channels 70 that are circumferentially arranged around the rotor core 56. Each of the magnet channels may extend from one end 80 of the core 56 to the other end 81. A plurality of permanent magnets 78 are embedded in the rotor core 56 with each magnet 78 being disposed in one of the channels 70 and extending axially through the rotor core 56. The magnet 78 may have a length that substantially matches the length of the core 56 so that the magnets 78 extend from the end 80 to the end 81.

The magnets 78 may be made from rare-earth metals and may include compounds such as $Nd_2Fe_{14}B$, $SmCo_5$, $Sm_2Co_{17}$, combinations thereof, and the like. These compounds of rare-earth metals may also include small percentages of other rare-earth metals to enhance properties of the magnets. Rare-earth metals are used in permanent magnets due to their favorable coercivity.

Figure 3:
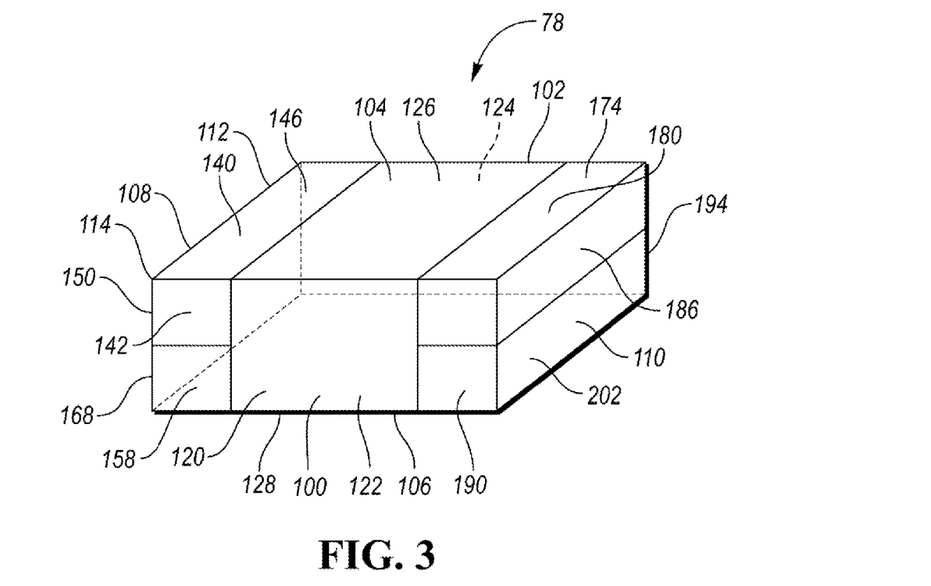
FIG. 3 is a perspective view on the permanent magnet for use in the rotor.

Referring to FIGS. 2 and 3, the permanent magnet 78, according to one or more embodiments, 78 is a rectangular prism having opposing first and second ends 100, 102, opposing front and back faces 104, 106 extending between the ends 100, 102, and opposing first and second sides 108, 110 that extend between the faces and between the ends. The magnets 78 may be arranged in the channels 70 with the fronts 104 facing generally outwardly towards the perimeter of the rotor 54.

The permanent magnets of an electric machine should be designed to withstand demagnetizing, which can occur during operation of the electric machine. The edges 112 and the corners 114 are the areas most susceptible to demagnetization. Previous solutions include increasing the magnet grade and enhancing the surface properties using grain boundary diffusion. These solutions generally increase cost. In this disclosure, the magnets 78 are formed from multiple pieces, some of which have magnetically easy crystallographic axes in different directions to better enable anti-demagnetizing capability of the magnet without substantial cost increase. The multi-piece permanent magnets 78 may also significantly reduce eddy-current loss in the magnets.

Figure 4:
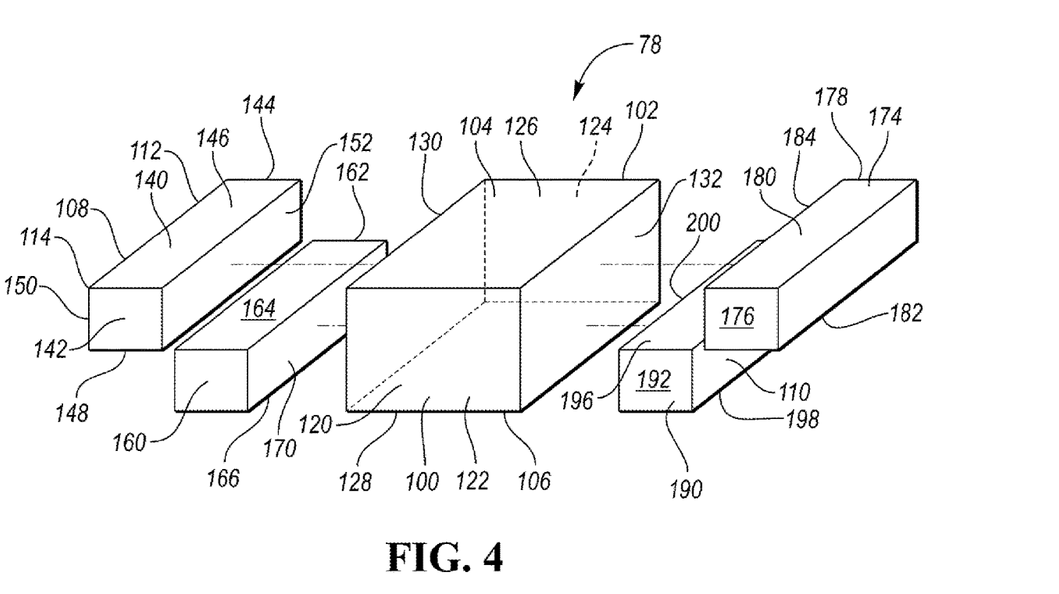
FIG. 4 is an exploded view of the permanent magnet of FIG. 3.

Referring to FIGS. 3 and 4, the magnet 78 may have a central piece 120 that extends along a length of the magnet 78. The central piece 120 may include opposing end surfaces 122 and 124 that form portions of the ends 100 and 102, respectively. The central piece 120 may further include a front surface 126 that forms a portion of the front face 104, a back surface 128 that forms a portion of the back face 106, and side surfaces 130, 132.

A front-left corner piece 140 may include end surfaces 142, 144, a front surface 146, a back surface 148, and side surfaces 150, 152. The front surface 146 forms a portion of the front face 104, the side surface 150 forms a portion of the side 108, and the side surface 152 is joined to the side surface 130 of the central piece 120. The end surfaces 142, 144 form portions of the ends 100, 102, respectively.

A back-left corner piece 158 may include end surfaces 160, 162, a front surface 164, a back surface 166, and side surfaces 168, 170. The back surface 166 forms a portion of the back face 106, the side surface 168 forms a portion of the side 108, the side surface 170 is joined to the side surface 130 of the central piece 120, and the front surface 164 is joined to the back surface 148 of the corner piece 140. The end surfaces 160, 162 form portions of the ends 100, 102, respectively.

A front-right corner piece 174 may include end surfaces 176, 178, a front surface 180, a back surface 182, and side surfaces 184, 186. The front surface 180 forms a portion of the front face 104, the side surface 186 forms a portion of the side 110, and the side surface 184 is joined to the side surface 132 of the central piece 120. The end surfaces 176, 178 form portions of the ends 100, 102, respectively.

A back-right corner piece 190 may include end surfaces 192, 194, a front surface 196, a back surface 198, and side surfaces 200, 202. The back surface 198 forms a portion of the back face 106, the side surface 202 forms a portion of the side 110, the side surface 200 is joined to the side surface 132 of the central piece 120, and the front surface 196 is joined to the back surface 182 of the corner piece 174. The end surfaces 192, 194 form portions of the ends 100, 102, respectively. The piece may be joined together to form the magnet 78 by epoxy or other bonding medium.

Figure 5:
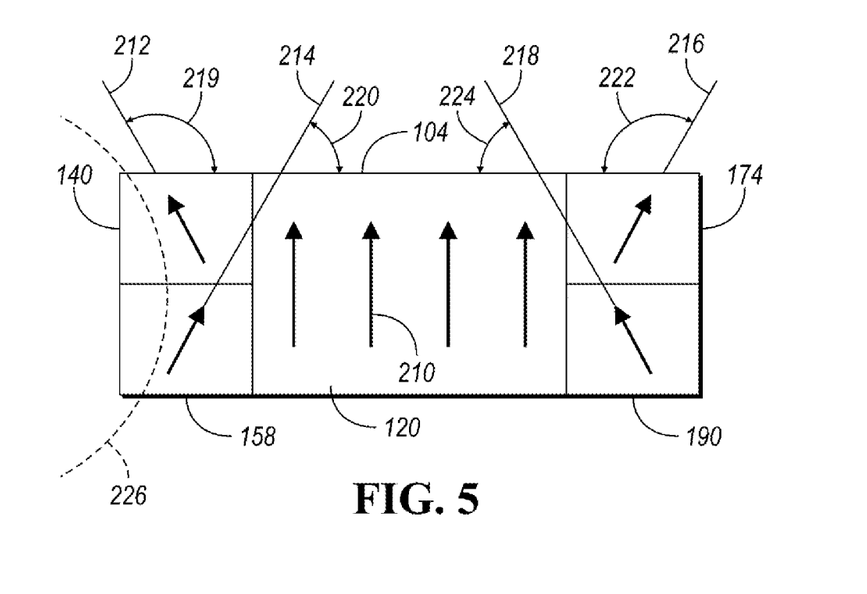
FIG. 5 is an end view of the permanent magnet of FIGS. 3 and 4.

Referring to FIG. 5, permanent magnets used in electric machines are anisotropic. This means there are two directions that are easiest to magnetize the material. These two directions are 180 degrees apart and thus can be referred to as a single axis since direction is not relevant for the purposes of this application. The line parallel to these directions is called the magnetically easy crystallographic axis (easy axis) and refers to an energetically favorable direction of spontaneous magnetization.

A typical permanent magnet is uniform having one easy axis. In a typical electric machine, the easy axis is normal to the front and back of the magnet. These designs may not be optimal due to the differing directions of the demagnetizing field at different portions of the magnet. Ideally, the easy axis is parallel to the demagnetizing field to resist demagnetization. A typical problem is that the easy axis it is not parallel to the demagnetizing field near the corners and edges of the magnet. Under certain conditions, these areas may become demagnetized, which is a permanent condition that reduces the performance of the electric machine.

The magnet 78 increases resistance to demagnetization by using multiple pieces of magnetic material, some of which, have easy axes in different directions. For example, the central piece may have an easy axis 210 that is substantially normal to the front and back faces 104, 106. Used herein, "substantially normal" means within ±5 degrees of true normal. In the illustration, the arrows indicate the direction of the poles with the arrows pointing toward the North pole, however, as discussed above the easy axis is directionless. In contrast to the central piece 120, the corner pieces are designed so that the easy axes are oblique with the front corner pieces 140, 174 projecting outwardly towards the North pole and with the back corner pieces 158, 190 projecting inwardly towards the North pole in one or more embodiments.

In one or more embodiments, the easy axis 212 of the front-left corner piece 140 forms an obtuse angle 219 with the front face 104. The easy axis 214 of the back-left corner piece 158 forms an acute angle 220 with the front face. The easy axis 216 of the front-right corner piece 174 forms an obtuse angle 222 with the front face 104. The easy axis 218 of the back-right corner piece 190 forms an acute angle 224 with the front face 104. As used herein and as shown in FIG. 5, all angle measurements are taken on the side of the easy axis nearest to the center of the magnet and are external to the magnet. While the front-corner pieces 140 and 174 are shown as having similar, albeit mirrored, easy axes, this need not be the case. The same is true for the back-corner pieces 158 and 190.

The angular orientations of the easy axes are designed based on the demagnetizing field of the particular electric machine, or based on the design to optimize the performance of electric machine. Thus, the magnets may be optimized for various electric machines by modifying the shown angles. In the illustrated embodiment, the easy axes 212, 214 are optimized for the demagnetizing field represented by dashed line 226. As can be seen, the easy axis 212 is generally parallel to the portion of the field 226 that extends through the corner piece 140. The easy axis 214 is also generally parallel to the portion of the field 226 that extends through the corner piece 158. The demagnetizing field 226 is curved through the side portion of the magnet 78 resulting in the axes 212 and 214 extending in different directions. This may not always be the case, and in some embodiments the axes 212 and 214 may extend in similar directions.

Figure 6:
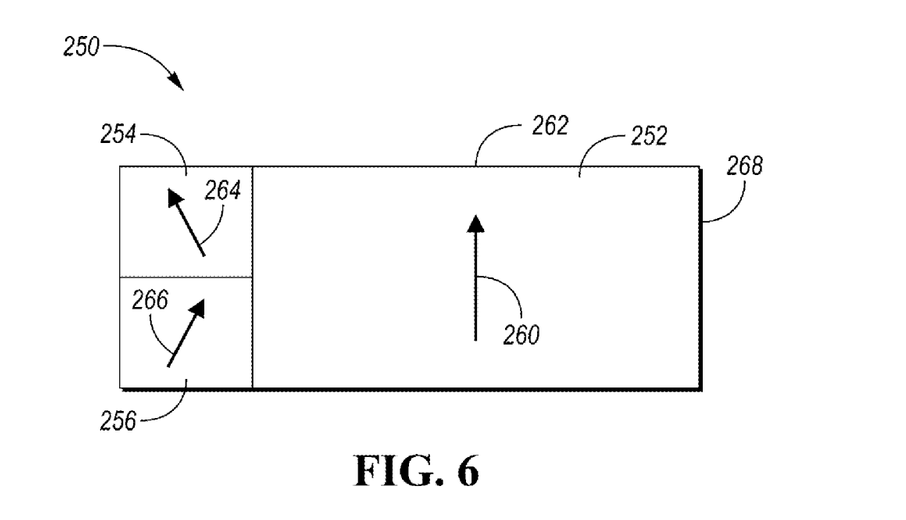
FIG. 6 is an end view of another permanent magnet.

FIG. 6 illustrates an alternative embodiment in which the magnet 250 only includes corner pieces on one side. The magnet 250 may include a main piece 252 and a pair of corner pieces 254 and 256 joined to a side 258 of the main piece 252. The main piece may have an easy axis 260 that is substantially normal to the front face 262 of the main piece. Corner piece 254 may have an easy axis 264 that projects outwardly similar to corner piece 140. The corner piece 256 may have an easy axis 266 that projects inwardly similar to corner piece 158. The magnet 250 may be used in applications in which only the side 268 of the magnet 250 is subject to elevated risk of demagnetization.

Figure 7:
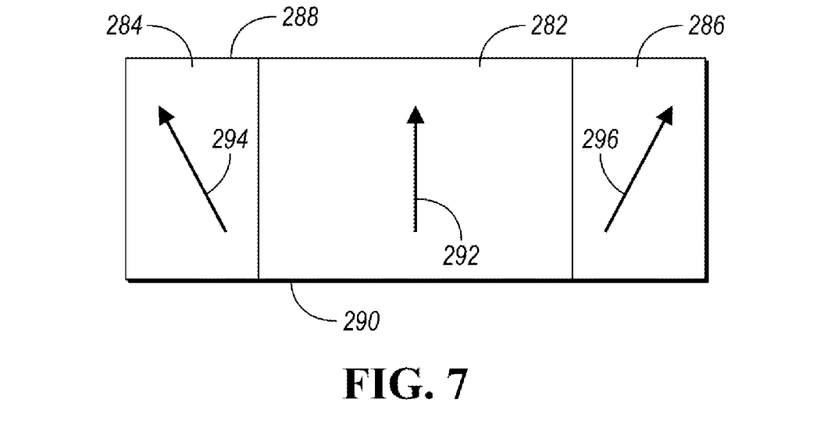
FIG. 7 is an end view of yet another permanent magnet.

FIG. 7 illustrates another alternative embodiment in which the magnet 280 includes a centerpiece 282 having an easy axis 292 and a pair of side pieces 284 and 286 having easy axes 294, 296. Unlike the above-described corner pieces, the side pieces extend between the front 288 and the back 290 of the magnet. This results in the magnet 280 having constant easy axes on the side portions of the magnet. This design may be used when only the front portions of the sides have an elevated risk of demagnetization for example.

Figure 8:
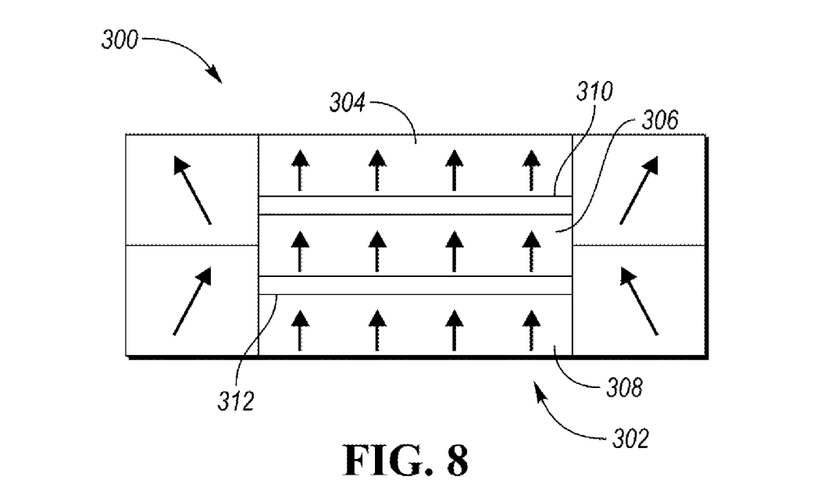
FIG. 8 is an end view of a permanent magnet having hard-phase and soft-phase materials.

Referring to FIG. 8, the magnets may also be formed of both hard-phase and soft-phase materials. This may reduce cost and enhance the flux density of the magnet. A permanent magnet 300, according to one or more embodiments, includes a central piece 302 having layers or other sections or portions of magnetically hard-phase material that include rare-earth metal(s) and magnetically soft-phase material that do not include rare-earth metal. In the illustrated embodiment, the magnet 300 includes a first layer of hard-phase material 304, a second layer of hard-phase material 306, and a third layer of hard-phase material 308, and two layers of soft-phase material 310, 312 that are sandwiched between the hard-phase layers. Magnetically hard-phase materials usually have high coercivity to provide anti-demagnetizing ability during motor operation. Typical magnetically hard-phase materials include $Nd_2Fe_{14}B$, $Sm_2Co_{17}$, $SmCo_5$, MnBi, SmFeN, etc. Magnetically soft-phase materials usually have low coercivity but high polarization which provide high magnetic flux. Typical magnetically soft-phase materials include Fe, Co, FeCo, FeNi, FeN, etc. Applicant's co-pending application Ser. No. 16/438,937 (filed Jun. 12, 2019) describes the use of hard phase and soft phase materials in more detail and is incorporated in its entirety by reference herein. The magnet 300 includes corner pieces as described above in FIG. 3 that have easy axes that are oblique to the easy axis of the center portion, which is substantially normal to the front and back faces of the magnet. For brevity, these components will not be described again.

The magnets of this disclosure may increase resistance to demagnetization while simultaneously reducing costs by utilizing multiple pieces of magnetic material that have their easy axes angularly oriented according to the demagnetizing field. The multi-piece construction may also reduce eddy-current loss in the magnet.

Directional terms used herein, such as front, back, end, side, etc., are made with reference to the views and orientations shown in the exemplary figures and are not to be interpreted as limiting the disclosed concept to the illustrated embodiments or any specific spatial orientation. The terms "side," "face," and "surface" were chosen for ease of description and do not imply any structural differences between them unless otherwise noted.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A rotor of an electric machine comprising:
   a rotor core defining a magnet channel extending axially between opposing ends of the rotor core;
   a permanent magnet disposed in the channel and having opposing ends and opposing major sides, the magnet including:
      a central piece of anisotropic magnetic material having a first magnetically easy crystallographic axis, and
      a corner piece of anisotropic magnetic material joined to the central piece and having a second magnetically easy crystallographic axis that is oblique to the first easy axis; and
      a second corner piece of anisotropic magnetic material joined to the central piece and having a third magnetically easy crystallographic axis that is oblique to the first easy axis;
   wherein the central piece further has opposing front and back surfaces and a side surface extending therebetween, wherein the corner piece and the second corner piece are joined to the side and are joined to each other.

2. The rotor of claim 1, wherein the central piece further has opposing front and back surfaces and opposing first and second side surfaces extending therebetween, wherein the corner piece is joined to the first side and the second corner piece is joined to the second side.

3. The rotor of claim 1, wherein the permanent magnet is prismatic having opposing front and back faces, and wherein the first easy axis is substantially normal to the front and back faces.

4. The rotor of claim 1, wherein a volume of the central piece is larger than a volume of the corner piece.

5. The rotor of claim 1, wherein the central piece further has a planar layer of a magnetically hard-phase material that includes rare-earth metal and a planar layer of a magnetically soft-phase material that does not include rare-earth metal.

6. A rotor of an electric machine comprising:
   a rotor core defining a magnet channel extending axially between opposing ends of the rotor core; and
   a prismatic permanent magnet disposed in the channel and having opposing first and second ends, opposing front and back faces extending axially between the opposing ends, and opposing first and second sides extending axially between the opposing ends and extending laterally between the opposing faces, the magnet being formed of multiple pieces and including:
      a central piece of magnetic material having a front surface that forms a portion of the front face, a back surface that forms a portion of the back face, and a side surface extending between the front and back surfaces, wherein the central piece has a first magnetically easy crystallographic axis that is substantially normal to the faces,
      a front corner piece joined to the side surface and having a front surface that forms a portion of the front face, a side surface that forms a portion the first side, and an end surface that forms a portion of the first end, wherein the front corner piece has a second magnetically easy crystallographic axis that is oblique to the first easy axis, and
      a back corner piece joined to the side surface of the central piece and to a back surface of the front corner piece, the back corner piece having a back surface that forms a portion of the back face, a side surface that forms a portion of the first side, and an end surface that forms a portion of the first end, wherein the back corner piece has a third magnetically easy crystallographic axis that is oblique to the first and second easy axes.

7. The rotor of claim 6, wherein an angle between the front face and the second easy axis is obtuse and an angle between the front face and the third easy axis is acute.

8. The rotor of claim 6, wherein the central piece further has a second side surface extending between the first and second surfaces and opposite the side surface, and wherein the magnet further includes a second front corner piece joined to the second side surface and having a front surface that forms a portion of the front face, a side surface that forms a portion of the second side, and an end surface that forms a portion of the first end, wherein the front corner piece has a fourth easy axis that is oblique to the first easy axis.

9. The rotor of claim 8, wherein the magnet further includes a second back corner piece joined to the second side surface and having a back surface that forms a portion of the back face, a side surface that forms a portion of the second side, and an end surface that forms a portion of the first end, wherein the back corner piece has a fifth magnetically easy crystallographic axis that is oblique to the first and fourth easy axes.

10. The rotor of claim 9, wherein an angle between the front face and the second easy axis is obtuse, an angle between the front face and the third easy axis is acute, an angle between the front face and the fourth easy axis is obtuse, and an angle between the front face and the fifth easy axis is acute.

11. The rotor of claim 6, wherein the central piece further includes a planar layer of a magnetically hard-phase material that includes rare-earth metal and a planar layer of a magnetically soft-phase material that does not include rare-earth metal.

12. The rotor of claim 6, wherein the magnet channel is a plurality of magnet channels, and the permanent magnet is a plurality of permanent magnets each disposed in one of the channels.

13. A multiple-piece permanent magnet of an electric machine comprising:
   a prismatic body having opposing first and second ends, opposing front and back faces extending axially between the opposing ends, and opposing first and second sides extending axially between the opposing ends and extending laterally between the opposing faces, the body being formed of multiple pieces and including:
      a central piece of magnetic material having a front surface that forms a portion of the front face, a back surface that forms a portion of the back face, and a side surface extending between the front and back surfaces, wherein the central piece has a first magnetically easy crystallographic axis that is substantially normal to the faces, and
      a first corner piece joined to the side surface and having a front surface that forms a portion of the front face, a side surface that forms a portion the first side, and an end surface that forms a portion of the first end, wherein the front corner piece has a second magnetically easy crystallographic axis that is oblique to the first easy axis, wherein the body further includes a second corner piece joined to the side surface of the central piece and to a back surface of the first corner piece, the second corner piece having a back surface that forms a portion of the back face, a side surface that forms a portion of the first side, and an end surface that forms a portion of the first end, wherein the second corner piece has a third magnetically easy crystallographic axis that is oblique to the first easy axis.

14. The permanent magnet of claim 13, wherein the central piece further has a second side surface extending between the first and second surfaces and opposite the side surface, and wherein the body further includes a third corner piece joined to the second side surface and having a front surface that forms a portion of the front face, a side surface that forms a portion the second side, and an end surface that forms a portion of the first end, wherein the third corner piece has a fourth easy axis that is oblique to the first easy axis.

15. The permanent magnet of claim 14, wherein the body further includes a forth corner piece joined to the second side surface and having a front surface joined to the back surface of the third corner piece, a back surface that forms a portion of the back face, a side surface that forms a portion of the second side, and an end surface that forms a portion of the first end, wherein the fourth corner piece has a fifth magnetically easy crystallographic axis that is oblique to the first easy axis.

16. The permanent magnet of claim 13, wherein the central piece further has a second side surface extending between the first and second surfaces and opposite the side surface, and wherein the body further includes a second corner piece joined to the second side surface of the central piece, the second corner piece having a side surface that forms a portion of the second side and an end surface that forms a portion of the first end, wherein the second corner piece has a third magnetically easy crystallographic axis that is oblique to the first easy axis.

17. The permanent magnet of claim 13, wherein the central piece further includes a planar layer of a magnetically hard-phase material that includes rare-earth metal and a planar layer of a magnetically soft-phase material that does not include rare-earth metal.

\* \* \* \* \*